US011526788B2

(12) United States Patent
Zolotow et al.

(10) Patent No.: US 11,526,788 B2
(45) Date of Patent: Dec. 13, 2022

(54) COGNITIVE SYSTEMATIC REVIEW (CSR) FOR SMARTER COGNITIVE SOLUTIONS

(71) Applicant: Kyndryl, Inc., New York, NY (US)

(72) Inventors: Clea Zolotow, Key West, FL (US); Calvin D. Lawrence, DeKalb, GA (US); Tedrick N. Northway, Alachua, FL (US); John Delaney, Kidalkey (IE); Mickey Iqbal, Colin, TX (US)

(73) Assignee: KYNDRYL, INC., New York, NY (US)

( * ) Notice: Subject to any disclaimer, the term of this patent is extended or adjusted under 35 U.S.C. 154(b) by 1104 days.

(21) Appl. No.: 16/004,597

(22) Filed: Jun. 11, 2018

(65) Prior Publication Data

US 2019/0378026 A1 Dec. 12, 2019

(51) Int. Cl.
*G06N 5/04* (2006.01)
*G06N 7/08* (2006.01)
*G06N 20/00* (2019.01)

(52) U.S. Cl.
CPC .............. *G06N 5/048* (2013.01); *G06N 7/08* (2013.01); *G06N 20/00* (2019.01)

(58) Field of Classification Search
CPC ................................ G06N 5/048; G06N 7/08
USPC .......................................................... 706/52
See application file for complete search history.

(56) References Cited

U.S. PATENT DOCUMENTS

| 6,112,175 | A | * | 8/2000 | Chengalvarayan ... G10L 15/065 704/E15.013 |
| 7,813,944 | B1 | | 10/2010 | Luk et al. |
| 8,041,597 | B2 | | 10/2011 | Li et al. |
| 9,390,383 | B2 | | 7/2016 | Harik |
| 9,697,469 | B2 | | 7/2017 | McMahon et al. |
| 2011/0060715 | A1 | | 3/2011 | Shankle |
| 2015/0025917 | A1 | | 1/2015 | Stempora |
| 2015/0073987 | A1 | * | 3/2015 | Dutt ..................... G06Q 50/265 705/44 |
| 2016/0004979 | A1 | * | 1/2016 | Getchius ................ G06Q 10/10 706/12 |

(Continued)

FOREIGN PATENT DOCUMENTS

WO 2016126464 A1 8/2016

OTHER PUBLICATIONS

Mule et al (Credit Card Fraud Detection Using Hidden Markov Model (HMM) 2014) (Year: 2014).*

(Continued)

*Primary Examiner* — Lut Wong
(74) *Attorney, Agent, or Firm* — Erik Swanson; Hunter E. Webb; Keohane & D'Alessandro, PLLC

(57) ABSTRACT

An approach for determining a veracity of a reported event is provided. In an embodiment, a set of predictor variables is retrieved from a selected use case. Each of these predictor values is a condition that indicates the veracity of the reported event. In addition, a set of hidden predictor variables is generated from a set of unstructured documents related to the reported event using a hidden Markov model that is based on the predictor variables using a cognitive system. These hidden predictor variables are combined with the set of predictor variables to generate a set of updated predictor variables. These updated predictor variables are used by the cognitive system to return a determination of the veracity of the reported event.

20 Claims, 7 Drawing Sheets

(56) References Cited

U.S. PATENT DOCUMENTS

2016/0117778 A1    4/2016   Costello et al.

OTHER PUBLICATIONS

Makki et al ("Fraud Analysis Approaches in the Age of Big Data—A Review of State of the Art" 2017) (Year: 2017).*

Abdallah et al ("Fraud detection system: A survey" 2016) (Year: 2016).*

Anbarasi et al., "Fraud Detection Using Outlier Predictor in Health Insurance Data", International Conference on Information, Communication & Embedded Systems, 2017, 6 pgs.

Kose et al., An Interactive Machine-Learning-Based Electronic Fraud and Abuse Detection System in Healthcare Insurance, ScienceDirect, Applied Soft Computing 36, 2015, pp. 283-299.

Nian et al., Auto Insurance Fraud Detection Using Unsupervised Spectral Ranking for Anomaly, ScienceDirect, The Journal of Finance and Data Science 2, Mar. 9, 2016, pp. 58-75.

Peng et al., The Health Care Fraud Detection Using the Pharmacopoeia Spectrum Tree and Neural Network Analytic Contribution Hierarchy Process, 2016 IEEE TrustCom-BigDataSE-ISPA, 6 pgs.

Srinivasan et al., "Modelling an Optimized Warranty Analysis methodology for fleet industry using data mining clustering methodologies with Fraud detection mechanism using pattern recognition on hybrid analytic approach", Procedia Computer Science 87, 2016, 322-327.

Thornton et al., "Predicting Healthcare Fraud in Medicaid: A Multidimensional Data Model and Analysis Techniques for Fraud Detection", ScienceDirect, Procedia Technology 9, 2013, 1252-1264.

Sundarkumar et al., One-Class Support Vector Machine based undersampling: Application to Churn prediction and Insurance Fraud detection, 2015 IEEE International Conference on Computational Intelligence and Computing Research, 2015,7 pgs.

\* cited by examiner

COGNITIVE SYSTEMATIC REVIEW (CSR) FOR SMARTER COGNITIVE SOLUTIONS

TECHNICAL FIELD

In general, embodiments of the present invention relate to event analysis and verification. Specifically, embodiments of the present invention provide a learning system that utilizes hidden Markov chains to verify the veracity of an event based on detected predictor variables.

BACKGROUND

In today's information technology environment, more and more activities that were previously performed by humans can be performed more quickly and efficiently by computers. These activities can include such tasks as performing complex calculations, monitoring various conditions and/or events, controlling machinery, providing automated navigation, and/or the like. One area in which the use of computers is currently expanding is the use of cognitive systems in solving problems.

Generally, cognitive systems, also called cognitive decision engines, take inputted information and analyze the information according to a set of rules and/or variables in a machine learning model to arrive at a solution. As such, the availability to the cognitive system of a greater number of variables and/or of variables that are more predictive of a particular outcome increases the probability that the cognitive system will arrive at an accurate solution.

However, in some areas, which variables should be used by a cognitive system may not be obvious or the predictive nature of these variables may not be evident. One such case may be in the area of insurance (e.g., fraud detection, risk management, marketing, case management, etc.). In these cases, individuals, such as business analysts, subject matter experts (SMEs), data scientists, quantitative consultants, IT departments, analytics departments, marketing departments, and/or multi-disciplinary managers, may be required to draw on their own subjective research to generate lists of predictors for predictive and other analytic models to support cognitive and predictive solutions.

SUMMARY

In general, an approach for determining a veracity of a reported event is provided. In an embodiment, a set of predictor variables is retrieved from a selected use case. Each of these predictor values is a condition that indicates the veracity of the reported event. In addition, a set of hidden predictor variables is generated from a set of unstructured documents related to the reported event using a hidden Markov model that is based on the predictor variables using a cognitive system. These hidden predictor variables are combined with the set of predictor variables to generate a set of updated predictor variables. These updated predictor variables are used by the cognitive system to return a determination of the veracity of the reported event.

A first aspect of the present invention provides a method for determining a veracity of a reported event, comprising: retrieving, from a selected use case, a set of predictor variables, each predicator variable of the set of predictor variables being a condition that indicates the veracity of the reported event; generating, using a cognitive system, a set of hidden predictor variables from a set of unstructured documents related to the reported event using a hidden Markov model that is based on the predictor variables; generating a set of updated predictor variables by combining the set of predictor variables and the hidden predictor variables; and returning, by the cognitive system, a determination of the veracity of the reported event based on the updated predictor variables.

A second aspect of the present invention provides a system for determining a veracity of a reported event, comprising: a memory medium comprising instructions; a bus coupled to the memory medium; and a processor coupled to the bus that when executing the instructions causes the system to: retrieve, from a selected use case, a set of predictor variables, each predicator variable of the set of predictor variables being a condition that indicates the veracity of the reported event; generate, using a cognitive system, a set of hidden predictor variables from a set of unstructured documents related to the reported event using a hidden Markov model that is based on the predictor variables; generate a set of updated predictor variables by combining the set of predictor variables and the hidden predictor variables; generate a set of updated predictor variables by combining the set of predictor variables and the hidden predictor variables; and return, by the cognitive system, a determination of the veracity of the reported event based on the updated predictor variables.

A third aspect of the present invention provides a computer program product for determining a veracity of a reported event, the computer program product comprising a computer readable storage media, and program instructions stored on the computer readable storage media, that cause at least one computer device to: retrieve, from a selected use case, a set of predictor variables, each predicator variable of the set of predictor variables being a condition that indicates the veracity of the reported event; generate, using a cognitive system, a set of hidden predictor variables from a set of unstructured documents related to the reported event using a hidden Markov model that is based on the predictor variables; generate a set of updated predictor variables by combining the set of predictor variables and the hidden predictor variables; and return, by the cognitive system, a determination of the veracity of the reported event based on the updated predictor variables.

Still yet, any of the components of the present invention could be deployed, managed, serviced, etc., by a service provider who offers to implement the teachings of this invention in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
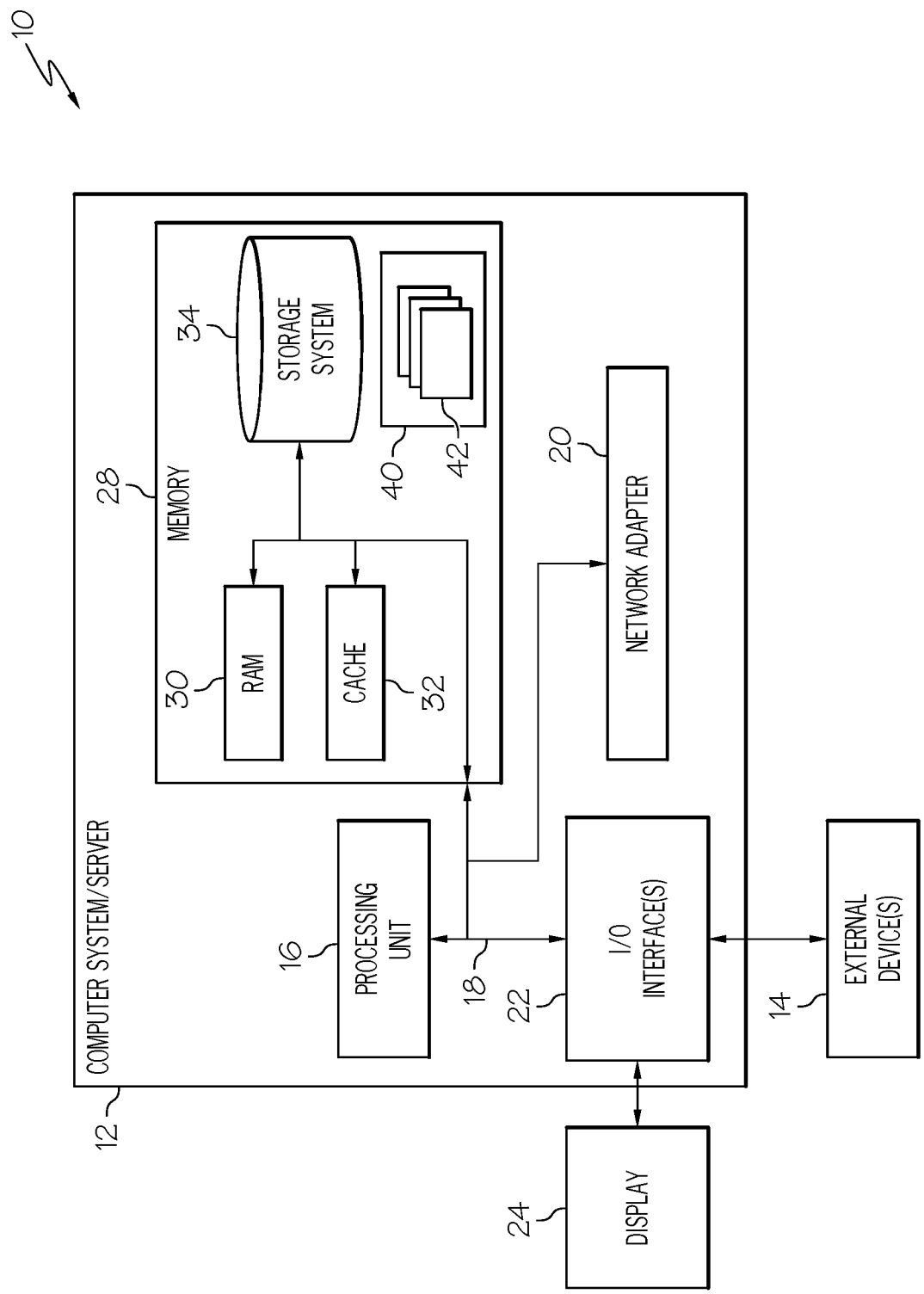
FIG. 1 depicts a computing environment according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for determining a veracity of a reported event. In an embodiment, a set of predictor variables is retrieved from a selected use case. Each of these predictor values is a condition that indicates the veracity of the reported event. In addition, a set of hidden predictor variables is generated from a set of unstructured documents related to the reported event using a hidden Markov model that is based on the predictor variables using a cognitive system. These hidden predictor variables are combined with the set of predictor variables to generate a set of updated predictor variables. These updated predictor variables are used by the cognitive system to return a determination of the veracity of the reported event.

Referring now to FIG. 1, a schematic of an example of a computing environment is shown. Computing environment 10 is only one example of a suitable computing environment and is not intended to suggest any limitation as to the scope of use or functionality of embodiments of the invention described herein. Regardless, computing environment 10 is capable of being implemented and/or performing any of the functionality set forth hereinabove.

In computing environment 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and/or the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing environment 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM, and/or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
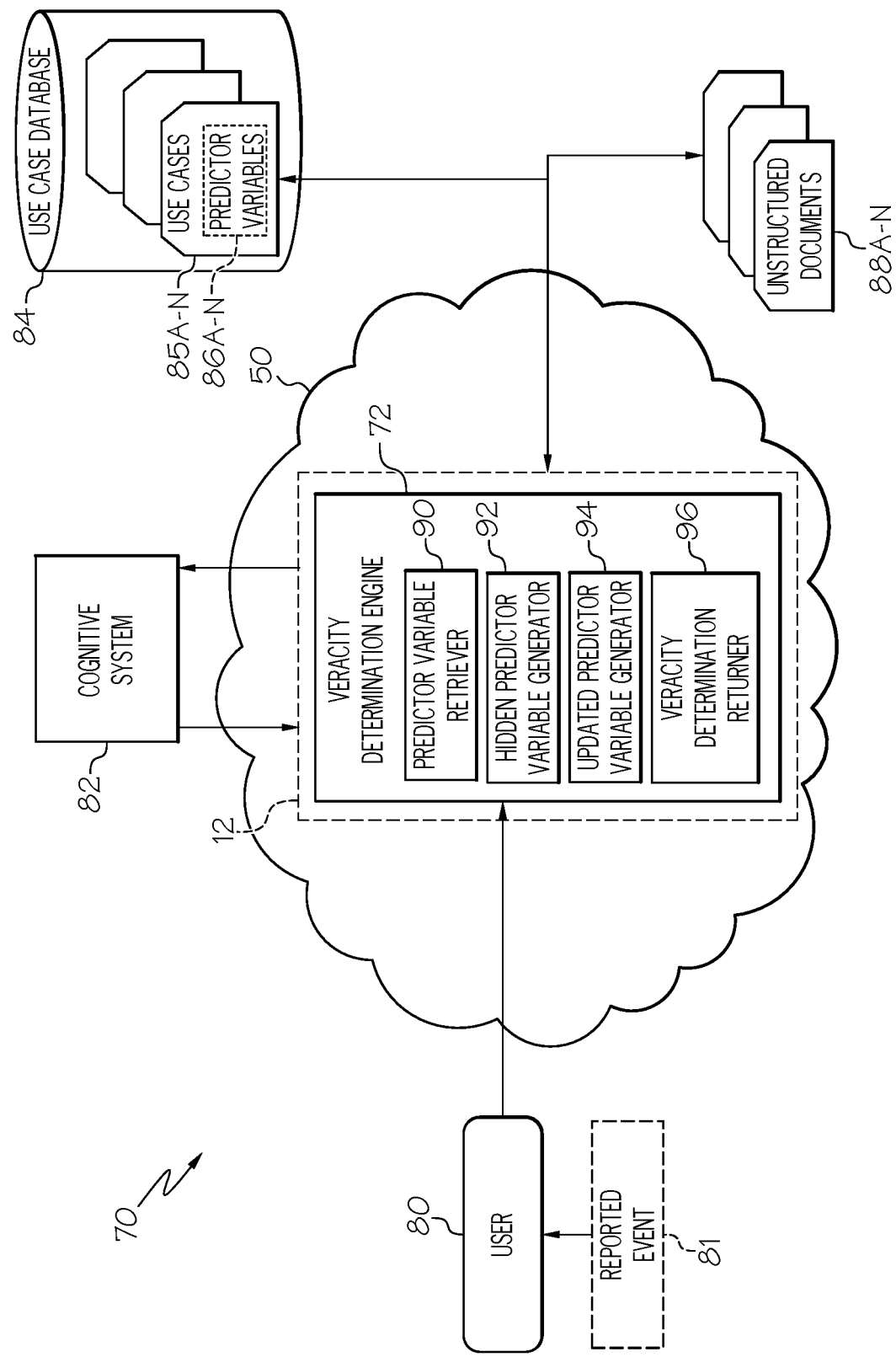
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each client need not have a veracity determination engine (hereinafter "system 72"). Rather, system 72 could be loaded on a server or server-capable device that communicates (e.g., wirelessly) with the clients to determine a veracity of a reported event therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 2 for brevity purposes.

Along these lines, system 72 may perform multiple functions similar to a general-purpose computer. Specifically, among other functions, system 72 can determine a veracity of a reported event 81 (e.g., by a user 80). To accomplish this, system 72 can include: a predictor variable retriever 90, a hidden predictor value generator 92, an updated predictor value generator 94, and a veracity determination returner 96.

Reported event 81 can be any statement made by user 80 for which verification is desired. To this extent, reported event 81 can include, but is not limited to: a report of a news item, a report of a data breach, a report of an insurance claim, an informational detail filled out on an application (e.g., for employment, for credit, to purchase insurance, for a background check, etc.), and/or the like. In any case, reported event 81 can be communicated by user 80 to veracity determination engine 72 using any solution for communicating information to a cognitive system 82 including, but not limited to: an electronic form and/or freeform selection, a tangible form and/or freeform selection, an audio or recorded audio selection, a video or recorded video selection, and/or the like.

The inventors of the invention described herein have discovered certain deficiencies in the current solutions for creating predictive cognitive solutions that can be used to determine the veracity of a particular reported event 81. For example, some current solutions for creating a predictive cognitive solution require a user to provide the variables used by the cognitive system 82, which may introduce subjective and/or biased factors into the variable selection process. In addition, the current manual process is also an increasingly untenable task to manage given the rapidly growing research base. This increasing amount of information makes it impossible to manually collect, digest, and weigh the impact of new research on the impact of these models in order to get near real-time feedback on new outcomes.

For example, in the field of insurance, someone could be trying to get lost wages from the insurance company from an automobile accident. However, suppose that this person is on a 20-mile bike ride through the Swiss Alps. Even though the person is probably not eligible for health-related employment compensation for missed wages while that person is not working, the information for making this determination may not be readily available to the person evaluating the claim.

This is exacerbated by the number of disciplines across different areas in which the cognitive system 82 may be utilized. For example, a cognitive system 82 utilized in the insurance sector may include a number of companies/organizations (e.g., risk management, marketing, case management, etc.). Many professionals within insurance organizations may not know where to look, may not know how to carefully consume often conflicting research articles/evidence, may not have enough time, and/or may not have access to the rapidly growing knowledge/research base online. As such, the current subjective and manual process may produce less rigorous and accurate predictive models for cognitive and predictive systems, and ultimately less return on investment (ROI) on the systems, given missed opportunities to take informed preventive action. Further, given the instantaneous nature of information (such as twitter and other social media feeds) it is impossible to manually process the information.

To this extent, the present invention system utilizes advanced mathematical modeling combined with cognitive learning to determine predictor variables 86A-N (singly 86N). Some or all of these predictor variables 86A-N can be generated from non-traditional sources, such as unstructured social media sources and/or unstructured research article data. In any case, these predictor variables are extended using a combination of different mathematical techniques, which may include a linear regression (for the delta Y—how far away each variable is from an expected outcome); a Multiple-criteria decision-making (MCDM) or multiple-criteria decision analysis (MCDA); a hidden Markov chain that finds hidden predictor variables 86A-N and reuses the hidden predictor variables 86A-N to determine the type of outcome from a multiple phase shift; and/or the like, and stores the newly discovered hidden predictor variables for use in evaluating later events.

This novel list of predictor variables based on evolving and growing research base data saves organizations time and resources that would otherwise be spent on research/modeling development and management costs. This evolving list is novel and unique because it helps users 80 (e.g., insurance professionals) to generate more rigorous, defensible, and accurate predictive models over time utilizing the stored database, which ultimately leads to better organization/company performance and outcomes. As such, the teachings of the current invention can, inter alia, improve the veracity determining ability of a cognitive system by discovering predictor variables 86A-N that were previously unknown and utilizing these predictor variables 86A-N to provide more accurate solutions.

Referring again to FIG. 2, predictor variable retriever 90 of system 72, as executed by computer system/server 12, can retrieve a set of predictor variables 86A-N from a selected use case 85N. Each retrieved predictor variable 86N represents a condition that can indicate the veracity of reported event 81. For example, for an automobile accident, in some cases predictor variables 86A-N may include the age of the drivers, the make and models of the automobiles involved, etc. In any case, the selected use case 85N from which the predictor variables are retrieved can be one of a plurality of uses cases 85A-N (singly 85N) stored in a use case database 84 that are each used to evaluate a different factual situation. Use case database 84 can use any type of database structure (e.g., relational, hierarchical, etc.) to store use cases 85A-N having predictor variables 86A-N.

In an embodiment, event details provided in conjunction with reported event 81 can be forwarded to cognitive system 82. Cognitive system 82 can compare these event details with corresponding information in the plurality of use cases 85A-N stored in the use case database 84. Cognitive system 82 can select the best fit use case 85N from among the use cases 85A-N in the use case database 84N based on this comparison.

In any case, the predictor variables 86A-N retrieved from the selected use case 85N represent a set of independent predictor variables 86A-N that have been previously tested in finding other solutions. How effective each predictor variable 86N has been when used to obtain a cognitive solution can be represented by a weighting factor that can accompany the predictor variable 86N within the use case 85N in the use case database 84.

Referring still to FIG. 2, hidden predictor variable generator 92 of system 72, as executed by computer system/server 12, is configured to generate a set of hidden predictor variables from a set of unstructured documents 88A-N related to the reported event. Unstructured documents 88A-N refer to any passage that conveys informational content (e.g., in a text-based format), without having information that is specifically indexed, annotated, tagged, etc., for use in conjunction with a cognitive system. To this extent, each unstructured document could be one or more phrases, clauses, sentences, paragraphs, pages, etc., and/or the like, and can be included in any digital location including, but not limited to, a web page, an aggregation site, a social media site, a blog, a pushed web document, an archive, and/or the like. In any case, the hidden predictor variables can be generated by a cognitive system using a hidden Markov model that is based on the predictor variables 86A-N, as will be described.

Figure 3:
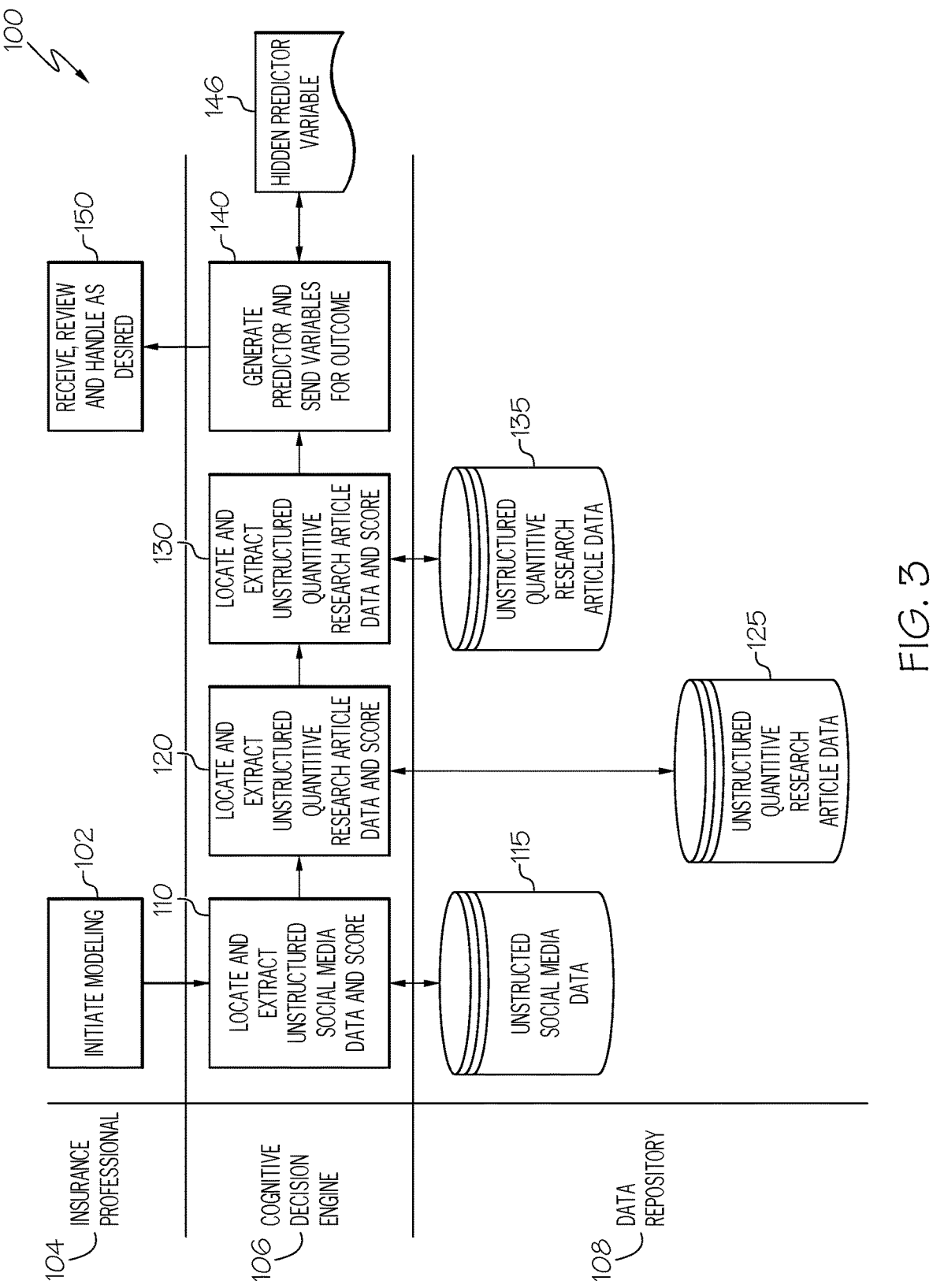
FIG. 3 depicts an example data flow diagram according to an embodiment of the present invention.

Referring now to FIG. 3, an example data flow diagram 100 is depicted according to an embodiment of the present invention. Referring additionally to FIG. 2, data flow diagram 100 illustrates an embodiment of a set of processes that hidden predictor variable generator 92 can perform to generate the hidden predictor variables 146. As shown, user 80 (e.g., insurance professional 104) initiates modeling at 102. To accomplish this, user 80 can provide a cognitive decision engine 106 with initial information, which can include, but is not limited to: predictor variables 86A-N retrieved by predictor variable retriever 90, event details provided in conjunction with reported event 81, and/or the like. Cognitive decision engine 106 can then retrieve unstructured documents 88A-N from various data repositories 108 based on this initial information. Unstructured documents 88A-N can be retrieved in real time as additions and updates that are made to the data become available over a network (e.g., the Internet). Additionally or in the alternative, unstructured documents 88A-N can be provided by one or more aggregation solutions that provide new or updated unstructured documents 88A-N on a periodic basis (e.g., hourly, daily, etc.). In either case, unstructured documents 88A-N can be provided to cognitive decision engine 106 directly and/or all or a subset of unstructured documents 88A-N can be stored in a more local data repository 108 for future access.

Accordingly, as illustrated, cognitive decision engine 106 locates and extracts unstructured social media data from an unstructured social media data repository 115 in process 110. This unstructured social media data can include, but are not limited to: a location of a particular person at a particular time (e.g., at the time of reported event 81), an amount/percentage of time that a particular person is located in a particular location, statements made by a particular person about reported event 81, environmental conditions occurring in the location in which reported event 81 occurred, information related to a personality of a person involved in reported event 81, information related to prior and/or normal activities performed by a person involved in reported event 81, and/or the like.

Additionally, the depicted cognitive decision engine 106 locates and extracts unstructured quantitative research article data from an unstructured quantitative research article data repository 125 in process 120. This quantitative research article data includes articles that focus on gathering numerical data and generalizing it across groups of people or to explain a particular phenomenon. To this extent, the quantitative research article data can be articles that include measurements and the statistical, mathematical, or numerical analysis of data collected through polls, questionnaires, surveys, and/or the like, and/or by manipulating pre-existing statistical data using computational techniques.

Also, the depicted cognitive decision engine 106 locates and extracts unstructured qualitative research article data from an unstructured qualitative research article data repository 135 in process 130. In general, this qualitative research article data includes articles that focus on gathering detailed non-numerical data pertaining to a particular event or set of events and extrapolating from these details to explain a particular phenomenon. To this extent, the quantitative research article data can be articles that include narratives, case studies, observations, focus group results, and/or the like.

In any case, once the relevant unstructured documents 88A-N have been located, extracted, and scored, cognitive decision engine 106 can generate the hidden predictor variables 146 and the hidden predictor variables 146 can be sent for outcome in process 140. For example, cognitive decision engine 106, based on information in unstructured documents 88A-N, has identified new predictor variables that include such variables as: slippery weather for slip and fall accidents; strange spending habits for opportunistic crimes, such as padding insurance claims; and geographic information obtained either via google or twitter feeds that show rate evasion (i.e., saying your car is somewhere else for cheaper rates). These new predictor variables can be aligned to extend tested independent predictor variables into nominal, ordinal, interval, etc. For example, the slippery weather variable could be extended into rain, slush, and snow for an ordinal data feed. The rate evasion variable via social media feeds could be extended to show an interval-based location vs. rate charge (i.e., how many miles away does it take your car to be registered for a significant rate change). The new predictor variables can then be reclassified into independent and dependent depending on linear regression.

Figure 4:
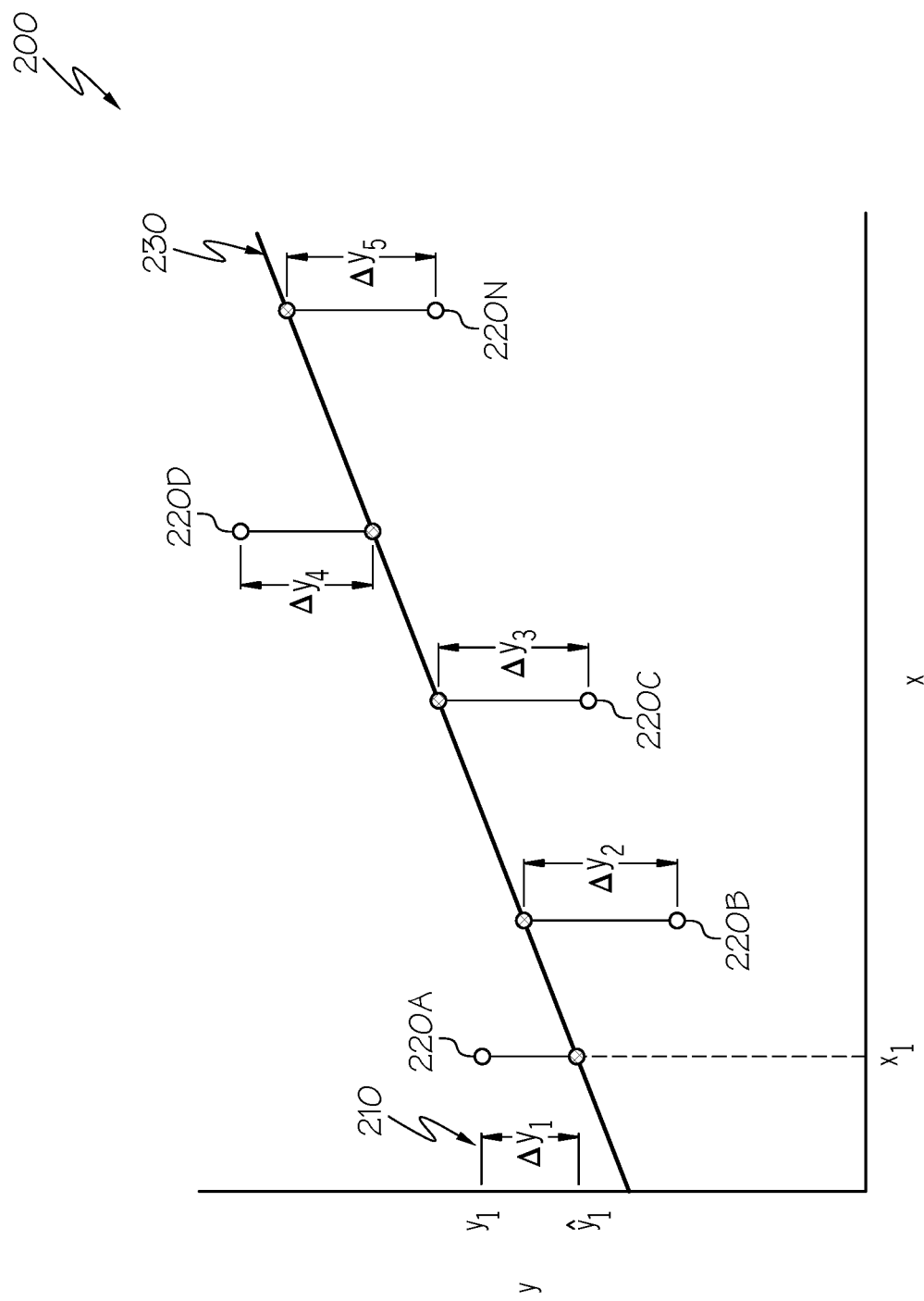
FIG. 4 depicts a graph of an example linear regression according to an embodiment of the present invention.

Referring now to FIG. 4, a graph 200 of an example linear regression is depicted according to an embodiment of the present invention. As shown, the variables that are extended in the step above are run through a linear regression. This determines the goodness of fit (e.g., as measured by $\Delta y$ 210) across the variables 220A-N to the expected outcome 230. For example, in the area of insurance fraud, the variable slush may be found to be related to slip and fall fraud (relatively low $\Delta y$) but not to rate charge fraud (relatively high $\Delta y$).

Once the new predictor variables have been reclassified, an extension of the analytic hierarchy process (AHP) can be performed to use multi-variable predictor algorithms for multiple-criteria decision-making (MCDM) or multiple-criteria decision analysis (MCDA) on the variables. Here, either bounded or unbounded can be used, and the criteria can be tested utilizing a decision space to find outliers that do not make sense. The resulting output can be analyzed using hidden Markov processes (as opposed to expectation maximization (EM)) to determine the generation of maximum likelihood for the learning algorithm.

Figure 5:
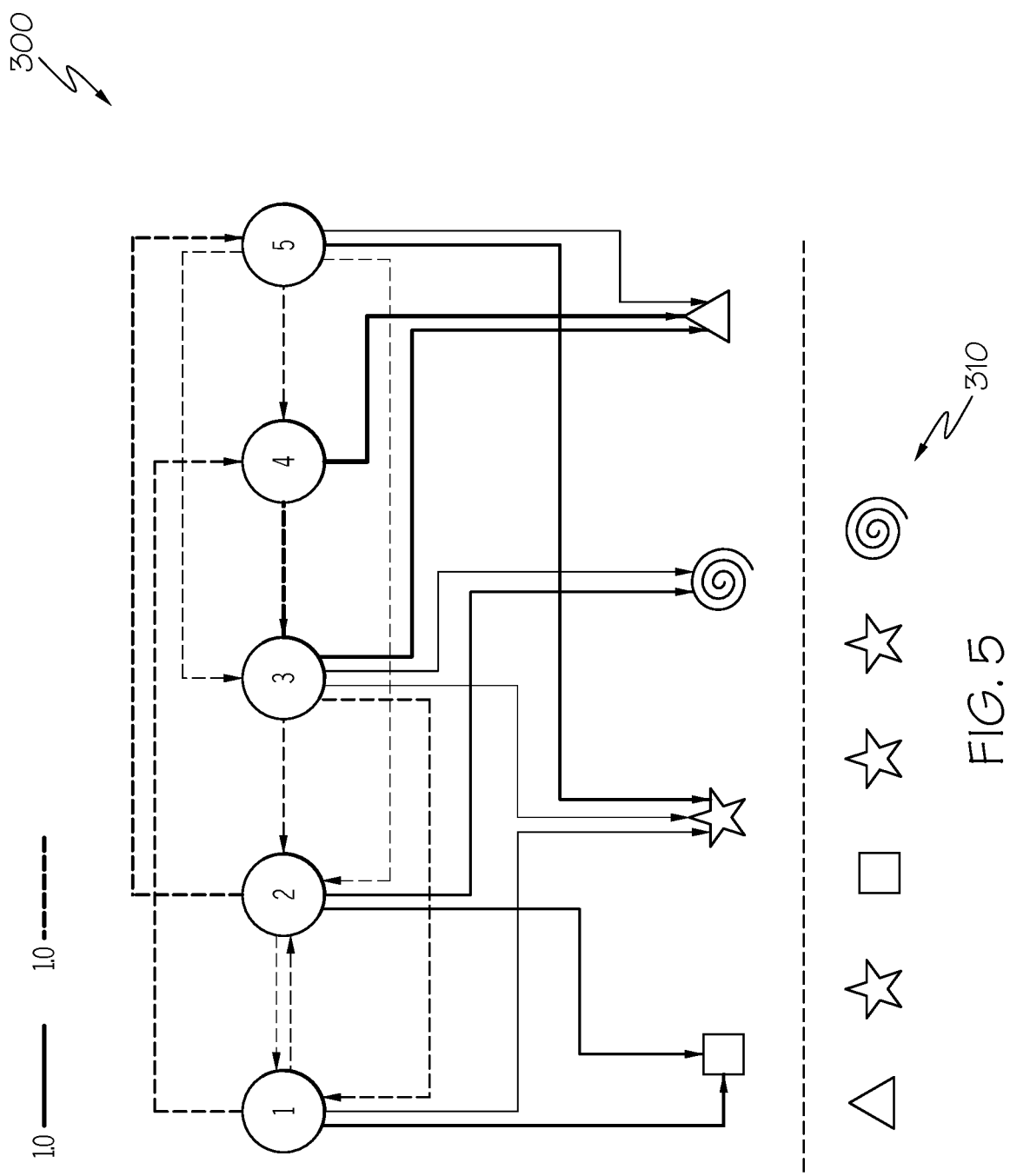
FIG. 5 depicts an example hidden Markov model according to an embodiment of the present invention.

Referring now to FIG. 5, an example hidden Markov model 300 is depicted according to an embodiment of the present invention. Hidden Markov model 300 traverses states corresponding to known predictor values and a known final outcome (i.e., an insurance claim) to find independent or new predictor variables that are hidden or latent. As illustrated, the states are generated with the most probable being the lighter to produce the output 310 shown below the graph. Here, a star could be a valid insurance claim, a box could be an aggrandized claim, and a spiral could be a good claim and not fraud-ful. The state changes above in the Markov sequence end up at one of the outputs shown. Here, based on the arrows that are present in the diagram, the following state sequences are candidates:

5 3 2 5 3 2
4 3 2 5 3 2
3 1 2 5 3 2

Hidden Markov model 300 can predict the probability of particular state leading to a particular outcome. Further, hidden Markov model 300 can determine the likelihood one or more additional states preceded that state that ultimately led to the particular outcome. Such of these states and their dependencies that were not previously known can be identified as the hidden predictor variables 146 (FIG. 3). As shown in FIG. 3, insurance professional 104 can receive, review, and handle these hidden predictor variables 146 as desired in process 150.

Referring again to FIGS. 2 and 3, updated predictor variable generator 94 of system 72, as executed by computer system/server 12, is configured to generate a set of updated predictor variables 86A-N. That is, the hidden predictor variables 146 that have been generated by hidden predictor variable generator 92 are combined with the existing set of predictor variables 86A-N retrieved by predictor variable retriever 90. The updated predictor variables 86A-N created by this combination can also include any newly discovered dependencies between predictor variables 86A-N and or any weight that was assigned to a particular hidden predictor variable 146 by cognitive decision engine 106 based on the predictive ability of the hidden predictor variable 146. In an embodiment, updated predictor variables 86A-N can be saved to a new or updated use case 85N, which can then be added or replaced, respectively, in use case database 84.

Veracity determination returner 96 of system 72, as executed by computer system/server 12, is configured to return a determination of the veracity of reported event 81. This determination is returned by cognitive system 82 based on the updated predictor variables 86A-N. To this extent, using the newly discovered hidden predictor variables 86A-N, their strengths, their degree of dependency, and their relationships with other predictor variables, cognitive system 82 can more successfully determine whether the reported event 81 is genuine. This determination can be later verified based on further gathered facts and/or conclusions and the weights of the predictor variables 86A-N used to make the determination can be updated accordingly. To this extent, cognitive system 82 can be introduced to learn and apply newly found predictor variables 86A-N that test successful for fraud to the model as well as weighting the unsuccessful predictors.

Figure 6:
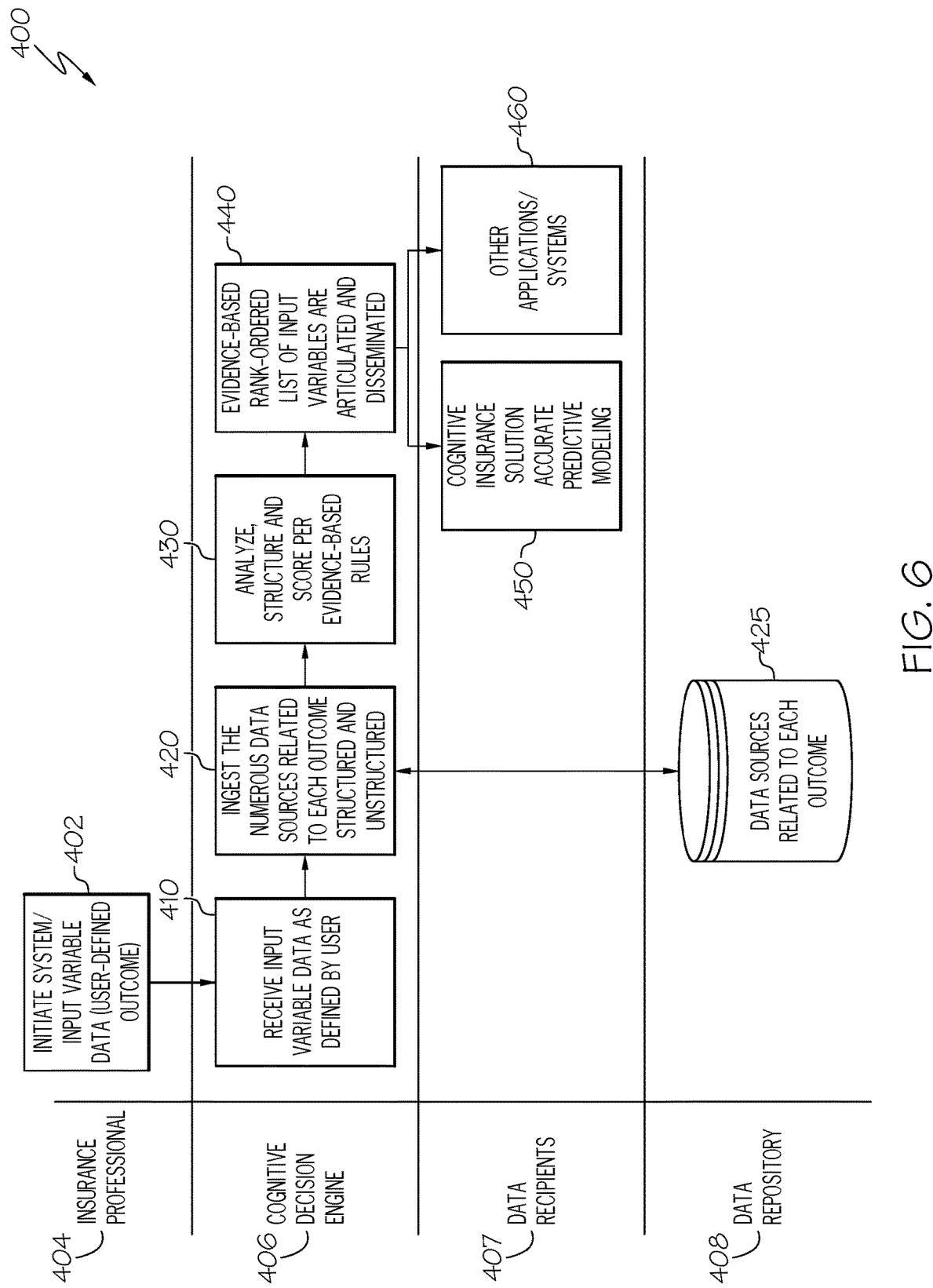
FIG. 6 depicts an example data flow diagram according to an embodiment of the present invention.

Referring now to FIG. 6, an example data flow diagram is depicted according to an embodiment of the present invention. Referring additionally to FIG. 2, user 80 (e.g., insurance professional 404) initiates the system processes and inputs the variable data (e.g., from reported event 81) in process 402. This input is received by cognitive decision engine 406 in process 410. In process 420, cognitive decision engine 406 ingests data sources related to each outcome 425 from data sources 408, which can include predictor variables 86A-N included in both structured (e.g., use case database 84) and unstructured (e.g., unstructured documents 88A-N) sources. In process 430, cognitive decision engine 406 analyzes, structures, and scores the ingested data per evidence-based rules. In process 440, cognitive decision engine 406 articulates an evidence-based rank-ordered list of input variables (e.g., updated predictor variables 86A-N) and disseminates them to data recipients 407. These data recipients 407 can include a cognitive insurance solution 450 that provides active predictive modeling as well as other applications/systems.

Figure 7:
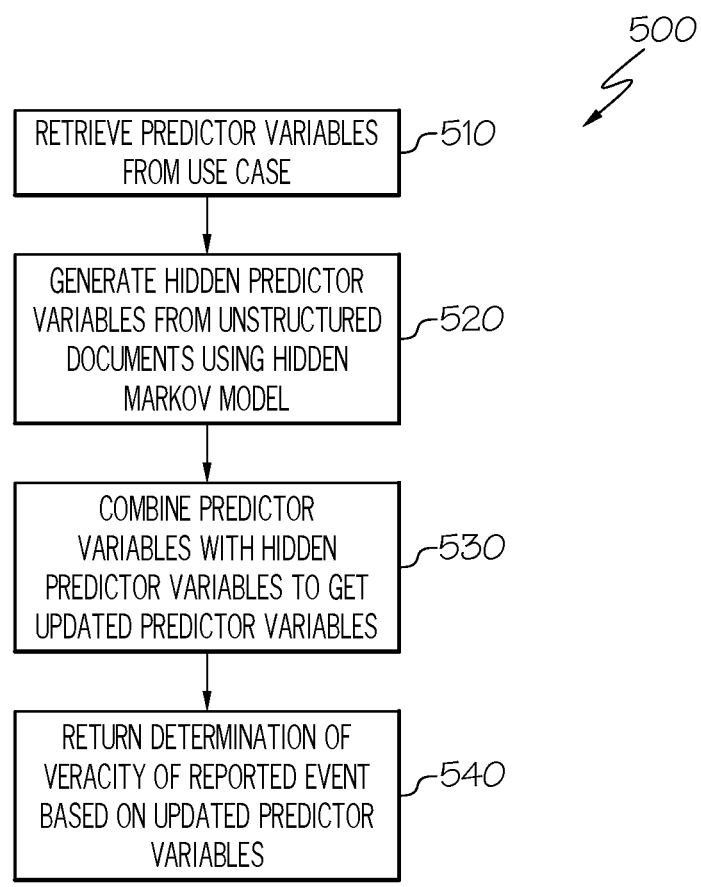
FIG. 7 depicts an example process flowchart according to an embodiment of the present invention.

Referring now to FIG. 7 in conjunction with FIG. 2, a method flow diagram 500 according to an embodiment of the present invention is shown. At 510, predictor variable receiver 90 of system 72, as executed by computer system/server 12, retrieves a set of predictor variables 86A-N from a selected use case 85N. Each predictor variable 86N of the set of predictor variables 86A-N is a condition that indicates the veracity of the reported event 81. At 520, hidden predictor variable generator 92 of system 72, as executed by computer system/server 12, generates a set of hidden predictor variables 86A-N from a set of unstructured documents 88A-N related to the reported event using a hidden Markov model that is based on the predictor variables 86A-N. At 530, updated predictor variable generator 94, as executed by computer system/server 12, generates a set of updated predictor variables by combining the set of predictor variables 86A-N and the hidden predictor variables. At 540, veracity determination returner 96 of system 72, as executed by computer system/server 12, returns a determination of the veracity of reported event 81 based on the updated predictor variables 86A-N.

The flowchart of FIG. 7 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for determining a veracity of a reported event, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for responding to a threat. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for determining a veracity of a reported event. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for determining a veracity of a reported event. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for determining a veracity of a reported event, comprising:
retrieving, from a selected use case selected from a plurality of use cases, a set of predictor variables specific to the selected use case, each predicator variable of the set of predictor variables being a condition that indicates the veracity of the reported event, wherein the reported event is claimed by a reporter to have previously occurred;
generating, using a cognitive system, a set of hidden predictor variables from a set of unstructured documents related to the reported event using a hidden Markov model based on a linear regression that is run on an extension of the predictor variables;
generating a set of updated predictor variables by a combining of the set of predictor variables and the hidden predictor variables that includes any newly discovered dependencies between predictor variables; and
returning a determination of the veracity of the reported event based on an analysis by the cognitive system using the updated predictor variables of event details of the reported event provided by the reporter along with an identification of the updated predictor variables used to make the determination.

2. The method of claim 1, the method further comprising:
comparing, using a cognitive system, the set of event details with a plurality of use cases in a use case database;
selecting a selected use case based on the comparing.

3. The method of claim 2, the method further comprising adding a use case having the updated predictor values to the use case database.

4. The method of claim 2, further comprising scoring the unstructured documents for relevance based on the set of event details.

5. The method of claim 4, wherein the set of unstructured documents includes unstructured social media data, which includes any location information of a person associated with the reported event, statements of the person about the reported event, and environmental conditions occurring in a location of the reported event, and unstructured research article data that includes articles that focus on gathering detailed non-numerical data pertaining to a particular set of events and extrapolating from the non-numerical data to explain a particular phenomenon.

6. The method of claim 1, further comprising assigning, by the cognitive system, a weight to each hidden predictor variable of the set of hidden predictor variables based on a predictive ability of the hidden predictor variable.

7. The method of claim 1, wherein the reported event is an insurance claim and wherein the returning of the determination of veracity determines whether the insurance claim is fraudulent.

8. A system for determining a veracity of a reported event, comprising:
a memory medium comprising instructions;
a bus coupled to the memory medium; and
a processor coupled to the bus that when executing the instructions causes the system to:
retrieve, from a selected use case selected from a plurality of use cases, a set of predictor variables specific to the selected use case, each predicator variable of the set of predictor variables being a condition that indicates the veracity of the reported event, wherein the reported event is claimed by a reporter to have previously occurred;
generate, using a cognitive system, a set of hidden predictor variables from a set of unstructured documents related to the reported event using a hidden Markov model based on a linear regression that is run on an extension of the predictor variables;
generate a set of updated predictor variables by a combining of the set of predictor variables and the hidden predictor variables that includes any newly discovered dependencies between predictor variables; and
return a determination of the veracity of the reported event based on an analysis by the cognitive system using the updated predictor variables of event details of the reported event provided by the reporter with an identification of the updated predictor variables used to make the determination.

9. The system of claim 8, the instructions further causing the system to:
compare, using the cognitive system, the set of event details with a plurality of use cases in a use case database;
select a selected use case based on the comparing.

10. The system of claim 9, the instructions further causing the system to add a use case having the updated predictor values to the use case database.

11. The system of claim 9, the instructions further causing the system to score the unstructured documents for relevance based on the set of event details.

12. The system of claim 11, wherein the set of unstructured documents includes unstructured social media data, which includes any location information of a person associated with the reported event, statements of the person about the reported event, and environmental conditions occurring in a location of the reported event, and unstructured research article data that includes articles that focus on gathering detailed non-numerical data pertaining to a particular set of events and extrapolating from the non-numerical data to explain a particular phenomenon.

13. The system of claim 8, the instructions further causing the system to assign, by the cognitive system, a weight to each hidden predictor variable of the set of hidden predictor variables based on a predictive ability of the hidden predictor variable.

14. The system of claim 8, wherein the reported event is an insurance claim and wherein the returning of the determination of veracity determines whether the insurance claim is fraudulent.

15. A computer program product for determining a veracity of a reported event, the computer program product comprising a computer readable storage media, and program instructions stored on the computer readable storage media, that cause at least one computer device to:
retrieve, from a selected use case selected from a plurality of use cases, a set of predictor variables specific to the selected use case, each predicator variable of the set of predictor variables being a condition that indicates the veracity of the reported event, wherein the reported event is claimed by a reporter to have previously occurred;
generate, using a cognitive system, a set of hidden predictor variables from a set of unstructured documents related to the reported event using a hidden Markov model based on a linear regression that is run on an extension of the predictor variables;
generate a set of updated predictor variables by a combining of the set of predictor variables and the hidden predictor variables that includes any newly discovered dependencies between predictor variables; and
return a determination of the veracity of the reported event based on an analysis by the cognitive system using the updated predictor variables of event details of the reported event provided by the reporter along with an identification of the updated predictor variables used to make the determination.

16. The computer program product of claim 15, the instructions further causing the at least one computer device to:
compare, using the cognitive system, the set of event details with a plurality of use cases in a use case database;
select a selected use case based on the comparing.

17. The computer program product of claim 15, the instructions further causing the at least one computer device to add a use case having the updated predictor values to the use case database.

18. The computer program product of claim 16, the instructions further causing the at least one computer device to score the unstructured documents for relevance based on the set of event details, wherein the set of unstructured documents includes unstructured social media data and unstructured research article data that includes articles that focus on gathering detailed non-numerical data pertaining to a particular set of events and extrapolating from the non-numerical data to explain a particular phenomenon.

19. The computer program product of claim 15, the instructions further causing the at least one computer device to assign, by the cognitive system, a weight to each hidden predictor variable of the set of hidden predictor variables based on a predictive ability of the hidden predictor variable.

20. The computer program product of claim 15, wherein the reported event is an insurance claim and wherein the returning of the determination of veracity determines whether the insurance claim is fraudulent.

\* \* \* \* \*